United States Patent [19]

Cunningham

[11] Patent Number: 4,838,388

[45] Date of Patent: Jun. 13, 1989

[54] CLAMPING MEANS FOR A STRAP

[75] Inventor: Douglas J. Cunningham, Portsmouth, England

[73] Assignee: Britax Limited, United Kingdom

[21] Appl. No.: 76,150

[22] Filed: Jul. 21, 1987

[30] Foreign Application Priority Data

Aug. 6, 1986 [GB] United Kingdom ............... 8619161

[51] Int. Cl.4 .................. B60R 21/10; B60R 22/20
[52] U.S. Cl. ................................ 188/65.1; 280/808; 297/476; 297/483
[58] Field of Search ............... 188/65.1; 297/483, 476; 280/806, 808

[56] References Cited

U.S. PATENT DOCUMENTS

| 4,306,735 | 12/1981 | Pfeiffer et al. ............... | 280/808 X |
| 4,547,018 | 10/1985 | Cunningham ................. | 297/483 |
| 4,549,769 | 10/1985 | Pilarski ......................... | 297/483 |
| 4,549,770 | 10/1985 | Kurtti ............................ | 297/483 X |
| 4,682,791 | 7/1987 | Ernst ............................. | 280/808 X |

FOREIGN PATENT DOCUMENTS

| 0147059 | 7/1985 | European Pat. Off. . |
| 0013221 | 2/1977 | Japan ............................ | 280/808 |

Primary Examiner—Andres Kashnikow
Assistant Examiner—Matthew C. Graham
Attorney, Agent, or Firm—Davis, Bujold & Streck

[57] ABSTRACT

Clamping member for a strap of the kind adapted to be located between a strap storage location and a strap utilization location, comprises a reaction member pivotally mounted on a base member for angular movement about a reaction member pivot axis, a guide member mounted for movement relative to the base member, and retention member for retaining the guide member and the reaction member in respective rest positions in which the strap is freely movable between the guide member and reaction member until the tension applied to the strap exceeds a predetermined level. Coupling member interconnects the reaction member and the guide member so that, when the tension in the belt exceeds the predetermined level, movement of the guide member causes corresponding movement of the reaction member, thereby wrapping the strap round both the reaction member and the guide member so that one layer of the strap is clamped against the reaction member by another layer of the strap. The reaction member is pivotally mounted on the base member by a first support link and the guide member is slidably mounted on guide member secured to the base member for movement in a direction having a component perpendicular to the reaction member pivot axis.

12 Claims, 2 Drawing Sheets

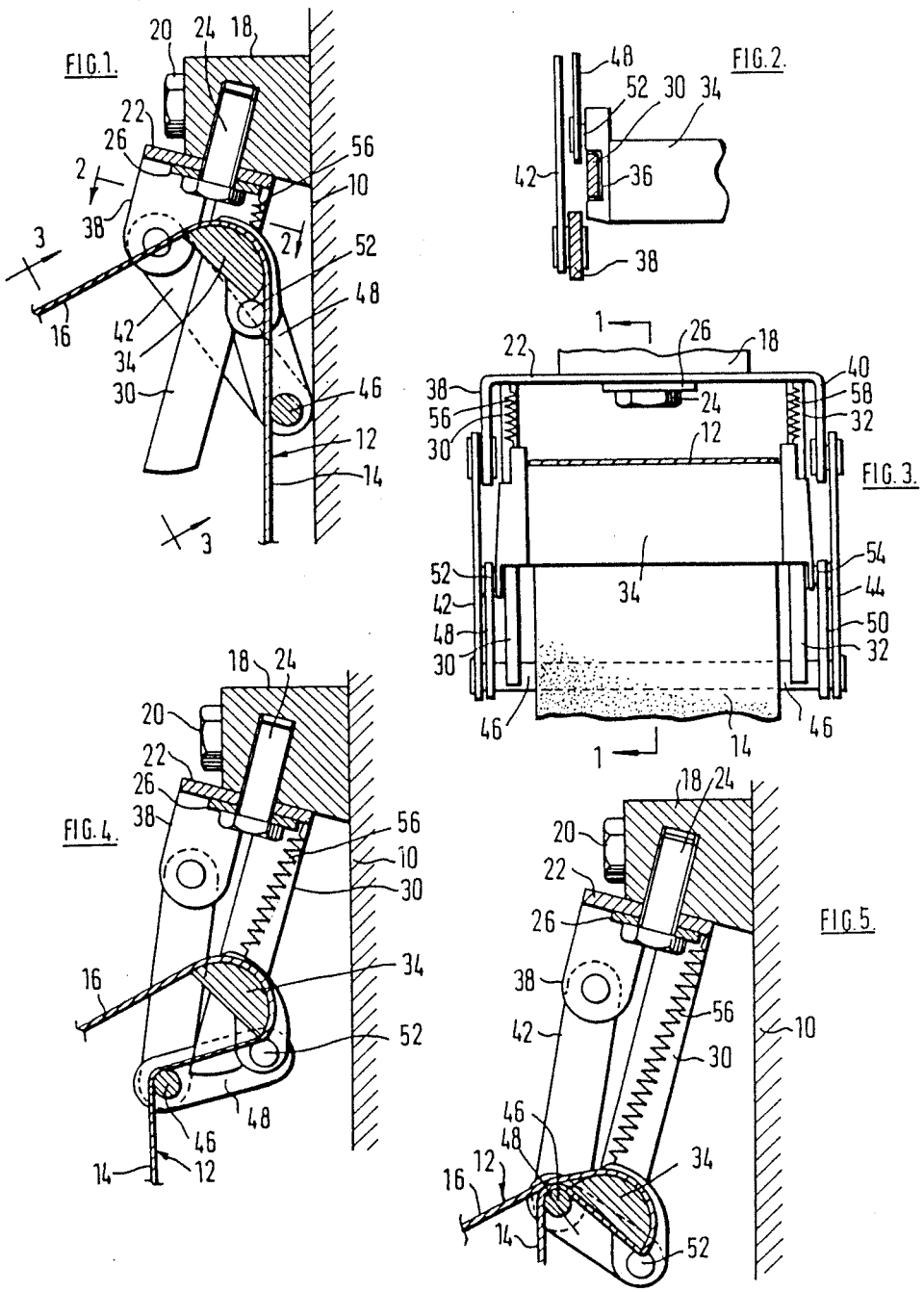

CLAMPING MEANS FOR A STRAP

This invention relates to clamping means for a strap and has particular application to the provision of clamping means for a vehicle safety belt system incorporating an emergency locking retractor.

Locking mechanisms for safety belt retractors commonly operate to lock the spindle of the retractor. With this arrangement, it is usual to find that an undesirably large length of strap is paid out after the spindle has locked, due to tightening of the coils of strap wound on the spindle. In addition, it is necessary for the retractor to be strong enough to take the maximum load which might be imposed on the strap during an accident.

Patent Specification No. EP-A-0147059 discloses clamping means for a strap which is adapted to be located between a strap storage location and a strap utilisation location and which comprises a reaction member pivotally mounted on a base member for angular movement about a pivot axis, a guide member mounted for movement relative to the base member, retention means for retaining the guide member and the reaction member in respective rest positions in which the strap is freely movable between the guide member and reaction member until the tension applied to the strap exceeds a predetermined level, and coupling means interconnecting the reaction member and the guide member so that, when the tension in the belt exceeds said predetermined level, movement of the guide member causes corresponding movement of the reaction member, thereby wrapping the strap round both the reaction member and the guide member so that one layer of the strap is clamped against the reaction member by another layer of the strap.

The present invention aims to provide clamping means of this type in which the extent to which the strap is wrapped round the reaction member and the guide member is increased, thereby reducing extent to which an imposed load can cause the strap to slip through the clamping means.

According to the invention, in clamping means of this type, the reaction member is pivotally mounted on the base member by means of a first support link and the guide member being slidably mounted on guide means secured to the base member for movement in a direction having a component perpendicular to the reaction member pivot axis.

An embodiment of the invention will now be described, by way of example, with reference to the accompanying drawings, in which:

FIG. 1 is a vertical cross-sectional view of clamping means in accordance with an embodiment of the invention, taken on the centre line thereof and showing the clamping means in its position of normal use;

FIG. 2 is a fragmentary cross-sectional view taken on the line 2—2 in FIG. 1;

FIG. 3 is a cross-sectional view taken on the line 3—3 in FIG. 1 and showing the line 1—1 on which the cross section of FIG. 1 is taken;

FIG. 4 is a cross-sectional view, similar to FIG. 1, but with the clamping means in an intermediate position;

FIG. 5 is a cross-sectional view, similar to FIG. 1, but with the clamping means in its fully locked position;

Figure 6:
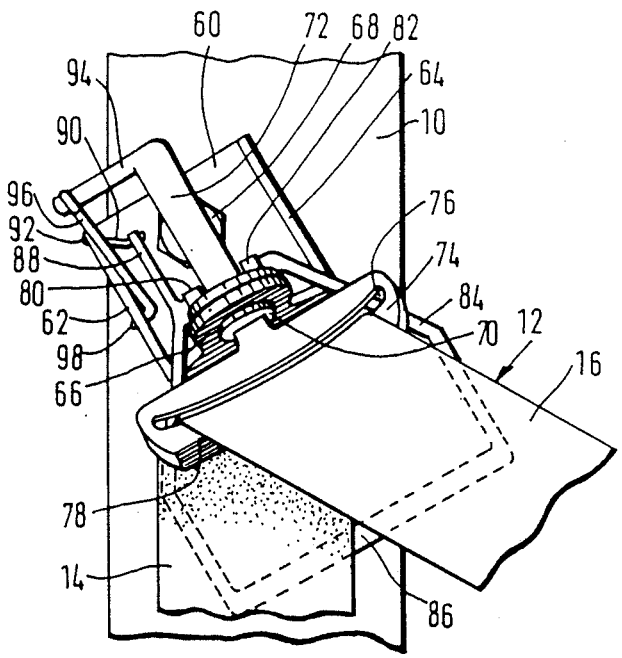
FIG. 6 is an elevational view of clamping means in accordance with another embodiment of the invention, showing the clamping means in its position of normal use.

FIG. 1 shows the B-post 10 of a motor vehicle having a shoulder anchorage incorporating clamping means in accordance with the invention attached thereto. The shoulder strap 12 of a safety belt has a first portion 14 leading from a retractor (not shown) to clamping means, and a second portion 16 extending from the clamping means to the shoulder (not shown) of a user.

An attachment block 18 is secured to the B-post 10 by a bolt 20. The block 18 has an inclined lower surface to which a base member 22 for the clamping means is pivotally attached by means of a bolt 24, the axis of which approximately bisects the angle between the two parts 14 and 16 of the strap 12 in normal use. A washer 26 is located between the head of the bolt 24 and the base member 22, the latter being freely pivotable about the bolt 24.

The base member 22 has a first pair of downwardly projecting limbs 30 and 32 which together form a guide track for a guide member 34. The guide member 34 has grooves 36 in its ends which slidably engage with the limbs 30 and 32 of the base member. Between its ends, the guide member 34 has a semi-cylindrical upper surface round which the strap 12 extends.

The base member 22 also has a second pair of limbs 38 and 40 extending parallel to the limbs 30 and 32 but spaced apart from one another by a somewhat greater distance than the limbs 30 and 32. The limbs 38 and 40 are also shorter than the limbs 30 and 32 and located on the opposite side thereof to the B-post 10. Respective first support links 42 and 44 are pivotally attached to the limbs 38 and 40 and are joined at their free ends by a reaction member 46 which takes the form of a cylindrical rod. A pair of second support links 48 and 50 are pivotally mounted on the reaction member 46 at one end and are coupled by respective pivotal attachments 52 and 54 to respective ends of the guide member 34.

In normal use, the guide member 34 is biased to a position near the top of the limbs 30 and 32 by tension springs 56 and 58 extending between the guide member 34 and the base member 22. The reaction member 46 is nearer to the B-post 10 than the direct path of the portion 14 of the strap from the guide member 34 to the retractor (not shown) as illustrated in FIG. 1. The force exerted by the resilient means is sufficient to retain the guide member 34 in this position against the force exerted by the rewind spring of the retractor.

If the retractor locks so that the tnesion in the strap 12 increases, the resulting force on the guide member 34 pulls it down the limbs 30 and 32. The second support links 48 and 50 cause simultaneous angular movement of the reaction member 46 in a direction away from the B-post 10, first to the position shown in FIG. 4 and then to the position shown in FIG. 5, the length of the first pair of limbs 30 and 32 being such that they do not foul the reaction member 46 during this movement. The strap 12 is thus wrapped round the guide member 34 and the portion 14 thereof brought into face-to-face engagement with the portion 16 at the point of·contact with the reaction member 46, thus firmly clamping the strap. The movement of the guide member 34 down the limbs 30 and 32 pays out a greater length of strap than is taken up by the outward and upward movement of the reaction member 46, with the result that the latter movement is not resisted by the locked retractor.

When the tension in the safety belt is relaxed, the tension springs 56 and 58 moves the guide member 34 back up the limbs 30 and 32, with the result that the reaction member 46 pivots back to its original position as illustrated in FIG. 1.

Figure 7:
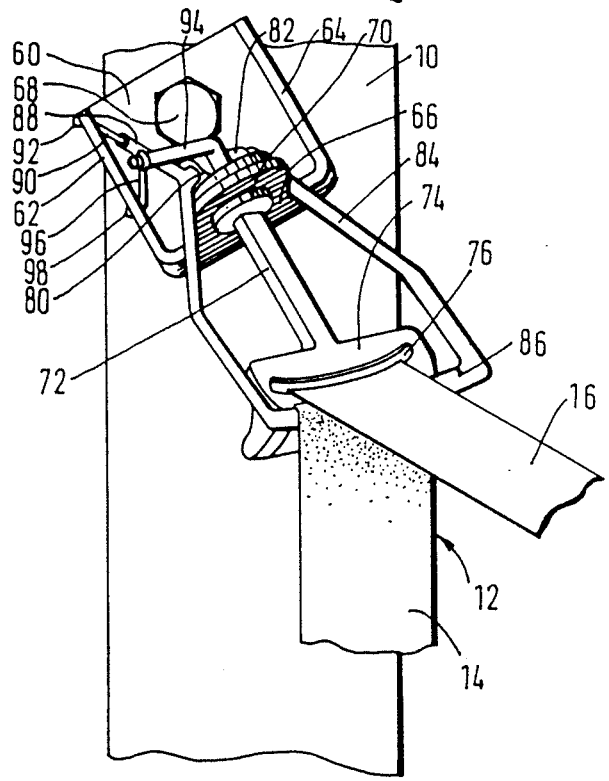
FIG. 7 is an elevational view, similar to FIG. 6, but with the clamping means in its fully locked position.

The embodiment illustrated in FIGS. 1 to 5 relies on tension in the shoulder strap 12 of the safety belt to cause it to pivot on the bolt 24 into a position in which it lies normal to the bisector of the angle between the two belt portions 14 and 16 when the mechanism is in its clamped position shown in FIG. 5. Any resistance to this pivoting movement could result in the strap bunching at one end of the guide member 34, with the result that the clamping action would be less effective. FIGS. 6 and 7 illustrate another embodiment of the invention which is not subject to this disadvantage.

A base member 60, having side walls 62 and 64 and a bottom wall 66, is secured, by a bolt 68, to the B-post 10 at an angle such that the bottom wall 66 is inclined to the horizontal with its front end (rleative to the vehicle in which it is mounted) higher than its rear end. The bottom wall 66 contains a circular hole in which is journaled a carrier 70. A rectangular bar 72 projects through a rectangular slot in the carrier 70 parallel to the axis of rotation of the latter relative to the bottom wall 66.

Formed on the lower end of the bar 72 is a guide member 74 containing an arcuate slot 76 through which the shoulder strap 12 passes. The front face of the guide member 74 (as viewed in the drawings) is flat and the bottom edge 78 of the front face is straight. However the rear face of the guide member 74 is convex, the precise curvature being chosen to compensate for the concave curvature of the bottom edge of the slot 76, with the result that the path length for the strap 12 round the guide member 74 from the portion 14 to the portion 16 does not vary across the width of the guide member 74. Consequently, as the portion 16 moves forwardly and rearwardly, for example as a user changes his position in his seat, the shoulder strap 12 moves freely along the slot 76 without any tendency to bunch.

On its top surface, the carrier 70 has two upstanding projections 80 and 82 in which is journaled a stirrup 84. The bottom of the stirrup 84 forms a straight reaction member 86. The stirrup 84 also has an upwardly projecting limb 88, the upper end of which is pivotally connected to one end of a first control link 90. The other end of the control link 90 is pivotally connected to the side wall 62 of the base member 60 at a location 92.

Similarly, the rectangular bar 72 has a side limb 94 on its upper end. The outer end of the limb 94 is pivotally connected to a second control link 96 which is formed of spring wire. The other end of the control link 96 is secured fast with the side wall 62 at a location 98 so that the control link 96 serves as a torsion spring biasing the mechanism into its position of normal use, as shown in FIG. 6. The pivotal connection at the other end of the second control link 96 and the pivotal connections at both end of the first control link 90 are universal couplings allowing a limited range of pivotal movement in any direction.

When the mechanism is in the position shown in FIG. 6, the strap 12 can pass freely through the slot 76. If protraction of the portion 14 is restricted, tension applied to the portion 16 causes guide member 74 to move downwards, pulling the rectangular bar 72 down through its slot in the carrir 70. The second control link 96 causes a simultaneous angular movement of the guide member 72 and, with it, of the carrier 70 and the stirrup 84. The first control link 90 causes simultaneous pivotal movement of the stirrup 84 relative to to the carrier 70, bringing the reaction member 86 into close proximity to the straight bottom edge 78 of the guide member 74, as shown in FIG. 7, thereby clamping the strap 12 in a similar manner to that described with reference to FIGS. 1 to 5. If the tension in the strap 12 is relaxed, the resilience of the second control link 96 moves the mechanism back to the position shown in FIG. 6.

The lengths of the second control link 96 and the location 98 at which it is coupled to the side wall 62 are chosen so that the guide member 74 lies substantially parallel to the B-post 10 when the mechanism is in the position shown in FIG. 6, and lies normal to the bisector of the angle between the two belt portions 14 and 16 when the mechanism is in its clamped position shown in FIG. 7. The length of the first control link 90 and the location 92 at which it is coupled to the side wall 62 are then chosen so that the reaction member 86 moves past the guide member, so as to initiate clamping at an early stage of the downward movement of the guide member 86, and then moves back into close proximity to the straight bottom edge 78 of the clamping member. This enables the length of strap paid out into the portion 14 to compensate for the length of strap drawn in as it is wrapped round the guide member 74 and the reaction member 86, thus avoiding any risk of tension in the portion 14 inhibiting completion of the clamping movement.

Instead of the control links 90 and 96, cam followers coupled to the guide member 74 and the reaction member 86 may be arranged to engage with cam surfaces on the base member 60 to provide the required synchronisation of movement. In this case it is necessary to provide a separate spring to bias the mechanism into the position shown in FIG. 6.

I claim:

1. Clamping means for a strap adapted to be located between a strap storage location and a strap utilization location and comprising a base member, a reaction member, a first support link pivotally mounting the reaction member on the base member for angular movement about a reaction member pivot axis, guide means secured to the base member, a guide member having grooves slidably mounted with a guide track of the guide means for movement in a direction having a component perpendicular to the reaction member pivot axis, retention means for retaining the guide member and the reaction member in respective rest positions in which the strap is freely movable between the guide member and reaction member until the tension applied to the strap exceeds a predetermined level, and coupling means interconnecting the reaction member and the guide member so that, when the tension in the belt exceeds said predetermined level, movement of the guide member causes corresponding movement of the reaction member, thereby wrapping the strap round both the reaction member and the guide member so that one layer of the strap is clamped against the reaction member by another layer of the strap.

2. Clamping means according to claim 1, wherein the coupling means comprises a second support link pivotally connected to the reaction member at one end and pivotally connected to a respective end of the guide member at the other end so that, as the guide member moves from its rest position, the reaction member is moved from its rest position on one side of the guide means to the other side of the guide means, passing the line of movement of the guide member along the guide means on the opposite side of the guide member to the rest position thereof.

3. Clamping means according to claim 1, wherein the retention means comprises resilient means arranged to bias the guide member into its rest position.

4. Clamping means according to claim 3, wherein the base member is pivotally mounted on a bracket for angular movement about an axis perpendicular to the reaction member pivot axis, the bracket being adapted to be secured to a vehicle body.

5. Clamping means according to claim 3, wherein the coupling means comprises a second support link pivotally connected to the reaction member at one end and pivotally connected to a respective end of the guide member at the other end so that, as the guide member moves from its rest position, the reaction member is moved from its rest position on one side of the guide means to the other side of the guide means, passing the line of movement of the guide member along the guide means on the opposite side of the guide member to the rest position thereof.

6. Clamping means according to claim 5, wherein the base member is pivotally mounted on a bracket for angular movement about an axis perpendicular to the reaction member pivot axis, the bracket being adapted to be secured to a vehicle body.

7. Clamping means for a strap adapted to be located between a strap storage location and a strap utilisation location and comprising a base member, a reaction member, a first support link pivotally mounting the reaction member on the base member for angular movement about a reaction member pivot axis, guide means secured to the base member, a guide member slidably mounted on the guide means for movement in a direction having a component perpendicular to the reaction member pivot axis, retention means for retaining the guide member and the reaction member in respective rest positions in which the strap is freely movable between the guide member and reaction member until the tension applied to the strap exceeds a predetermined level, and coupling means interconnecting the reaction member and the guide member so that, when the tension in the belt exceeds said predetermined level, movement of the guide member causes corresponding movement of the reaction member, thereby wrapping the strap round both the reaction member and the guide member so that one layer of the strap is clamped against the reaction member by another layer of the strap;

the retention means comprises resilient means arranged to bias the guide member into its rest position; and wherein the coupling means comprises a carrier which is pivotally mounted on the base member for angular movement about a carrier pivot axis perpendicular to the reaction member pivot axis, and the guide means comprises a non-circular opening extending through the carrier parallel to the carrier pivot axis and a bar of the same cross-section as the non-circular opening having the guide member mounted thereon, the coupling means further comprising first control means linking the reaction member to the base member so that angular movement of the carrier about the carrier pivot axis causes a related angular movement of the reaction member about the reaction member pivot axis and second control means linking the guide member to the base member so that movement of the bar relative to the carrier causes a related angular movement of the carrier about the carrier pivot axis.

8. Clamping means according to claim 7, wherein the first control means comprises a first control link pivotally connected between the first support link and the base member and the second control means comprises a second control link pivotally connected between a side limb on the bar and the base member.

9. Clamping means according to claim 8, wherein the second control link comprises a torsion spring secured fast with the base member and serving as the resilient means arranged to bias the guide member into its rest position.

10. Clamping means for a strap adapted to be located between a strap storage location and a strap utilisation location and comprising a base member, a reaction member, a first support link pivotally mounting the reaction member on the base member for angular movement about a reaction member pivot axis, guide means secured to the base member, a guide member slidably mounted on the guide means for movement in a direction having a component perpendicular to the reaction member pivot axis, retention means for retaining the guide member and the reaction member in respective rest positions in which the strap is freely movable between the guide member and reaction member until the tension applied to the strap exceeds a predetermined level, and coupling means interconnecting the reaction member and the guide member so that, when the tension in the belt exceeds said predetermined level, movement of the guide member causes corresponding movement of the reaction member, thereby wrapping the strap round both the reaction member and the guide member so that one layer of the strap is clamped against the reaction member by another layer of the strap;

wherein the coupling means comprises a carrier which is pivotally mounted on the base member for angular movement about a carrier pivot axis perpendicular to the reaction member pivot axis, and the guide means comprises a non-circular opening extending through the carrier parallel to the carrier pivot axis and a bar of the same cross-section as the non-circular opening having the guide member mounted thereon, the coupling means further comprising first control means linking the reaction member to the base member so that angular movement of the carrier about the carrier pivot axis causes a related angular movement of the reaction member about the reaction member pivot axis and second control means linking the guide member to the base member so that movement of the bar relative to the carrier causes a related angular movement of the carrier about the carrier pivot axis.

11. Clamping means according to claim 10, wherein the first control means comprises a first control link pivotally connected between the first support link and the base member and the second control means comprises a second control link pivotally connected between a side limb on the bar and the base member.

12. Clamping means according to claim 11, wherein the second control link comprises a torsion spring secured fast with the base member and serving as the retention means for retaining the guide member and the reaction member in said respective rest positions.

* * * * *